United States Patent [19]

Crawford et al.

[11] Patent Number: 4,844,227
[45] Date of Patent: Jul. 4, 1989

[54] TRIPLE FUNCTION SHIFT MECHANISM

[75] Inventors: Paul A. Crawford; Douglas F. Edwards, both of Mt. Vernon, Ohio

[73] Assignee: Dana Corporation, Toledo, Ohio

[21] Appl. No.: 178,636

[22] Filed: Apr. 7, 1988

[51] Int. Cl.[4] .................. B60K 41/28; F16D 67/02
[52] U.S. Cl. .................. 192/3.54; 74/411.5; 192/4 A; 192/4 C; 192/13 R; 192/18 R
[58] Field of Search .................. 192/3.54, 4 A, 4 C, 192/13 R, 18 R; 74/411.5

[56] References Cited

U.S. PATENT DOCUMENTS

| | | | |
|---|---|---|---|
| 2,180,470 | 11/1939 | Jaeger et al. | 192/4 C |
| 4,192,410 | 3/1980 | Poirier | 192/4 C X |
| 4,584,894 | 4/1986 | Fogelberg | 192/4 C X |
| 4,598,599 | 7/1986 | Ikemoto | 192/4 C X |

Primary Examiner—Allan D. Herrmann
Attorney, Agent, or Firm—Allen D. Gutchess, Jr.

[57] ABSTRACT

Shift mechanism is provided for a gearbox, such as a transmission or transaxle, of a small vehicle. The shift mechanism has three functions. It shifts or changes the gear-engaged condition of the gearbox. It moves a clutch between engaged and disengaged positions. It also actuates a brake of the vehicle to move it between a braking position and a release position. Further, the shift mechanism achieves all three of these functions through a single shift lever which is manipulated by an operator. The shift mechanism also causes the brake to be moved to its braking position at any time the gearbox is moved between a forward speed condition and a reverse speed condition, to avoid extreme, lurching movements of the vehicle.

22 Claims, 6 Drawing Sheets

TRIPLE FUNCTION SHIFT MECHANISM

This invention relates to shift mechanism for a gearbox, such as a transaxle of a small vehicle, which mechanism performs multiple functions.

Gearboxes with which the new shift mechanism is employed are commonly in the nature of transmisions or transaxles used with small vehicles and other small powered utility devices. These include riding lawnmowers, garden tractors, golf carts, snow blowers, garden tillers, snowmobiles, and the like. The gearbox typically has several conditions, including forward speeds, a neutral, and a reverse.

The shift mechanism in accordance with the invention includes a shift lever which is manually operated by an operator of the vehicle with the shift lever being movable in a manner to enable the shift mechanism to perform three separate functions. The shift lever can cause the gearbox to be in any one of its several conditions. The shift lever can also cause a clutch to be in an engaged position or a disengaged position. Finally, the shift lever can cause a brake to be in a braking position or a release position. Consequently, all three of these functions are within the control of an operator through manipulation of a single shift lever.

The shift mechanism in accordance with the invention can also cause the vehicle brake to be temporarily placed in its braking position when the shift lever is moved in a manner to change the gearbox from a forward speed condition to a reverse condition or vice versa. This prevents the vehicle from suddenly lurching if the gearbox is quickly shifted from a forward speed condition to reverse or vice versa.

It is, therefore, a principal object of the invention to provide shift mechanism for a gearbox of a vehicle, which mechanism shifts the gearbox, operates a clutch, and operates a brake through one shift lever control.

Another object of the invention is to provide a shift mechanism including a shift lever which can be manipulated by an operator to cause a gearbox of the vehicle to change gear-engaged conditions, to operate a clutch, and to operate a brake of the vehicle.

Still a further object of the invention is to provide shift mechanism for a vehicle having a gearbox, a clutch, and a brake, which mechanism causes the brake to move to a braking position temporarily when the gearbox is shifted between a forward speed condition and a reverse speed condition.

Many other objects and advantages of the invention will be apparent from the following detailed description of a preferred embodiment thereof, reference being made to the accompanying drawings, in which.

Figure 1:
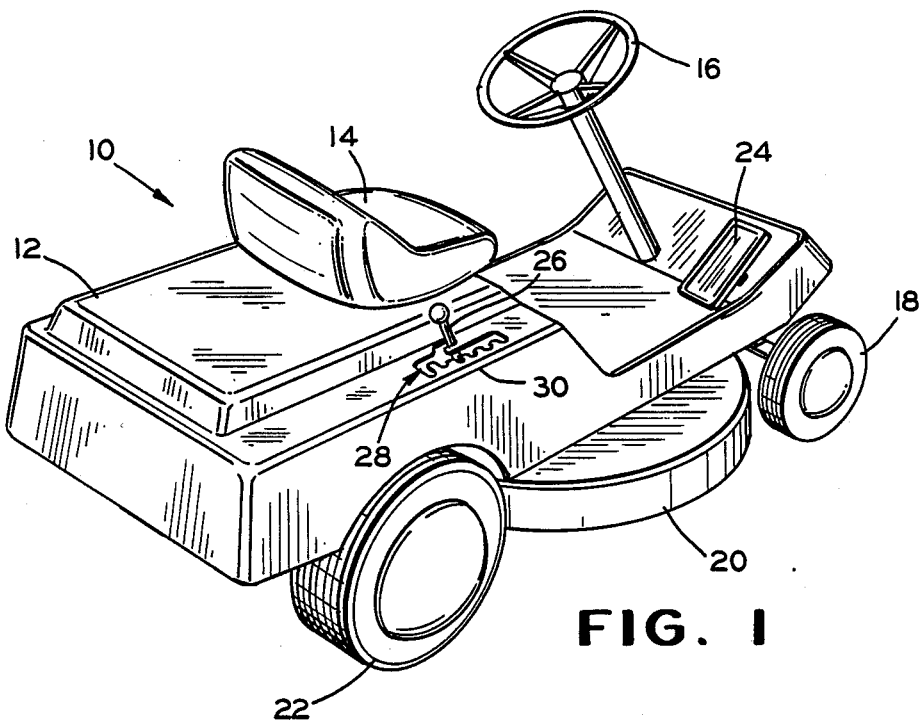
FIG. 1 is a schematic, rear view in perspective of a riding vehicle embodying the invention.

Referring to the drawings, and more particularly to FIG. 1, a small riding vehicle, specifically a lawn mower, embodying the invention is indicated at 10. The vehicle includes a chassis-body 12, a seat 14, a steering wheel 16, front wheels 18, a mower unit 20, and drive, rear wheels 22. The vehicle also includes a brake pedal 24 and a triple-function shift lever 26 extending through a specially-shaped guide slot 28 in a fender portion 30 of the chassis-body 12.

Figure 2:
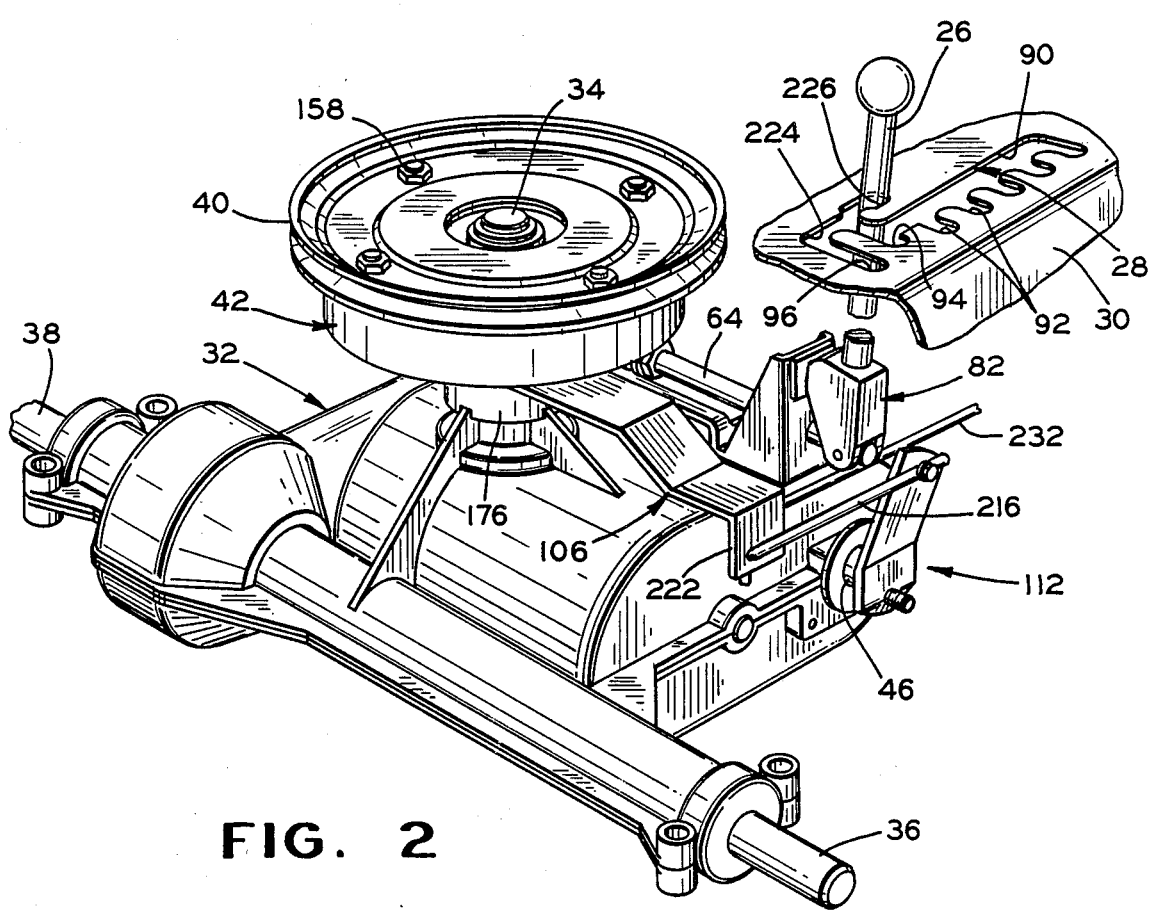
FIG. 2 is a somewhat schematic rear view in perspective of a transaxle and shift mechanism employed in the vehicle of FIG. 1 and embodying the invention.

The rear wheels 22 are driven by an engine (not shown) through a multi-speed gearbox or transaxle 32 of FIG. 2. The transaxle 32 has an input shaft 34 and output shafts 36 and 38 on which the rear wheels 22 are mounted. A pulley or sheave 40 is belt-driven by the engine and drives the input shaft 34 through a clutch 42. In this instance, as shown, the transaxle 32 has seven conditions, five forward speeds, neutral, and reverse.

Figure 5:
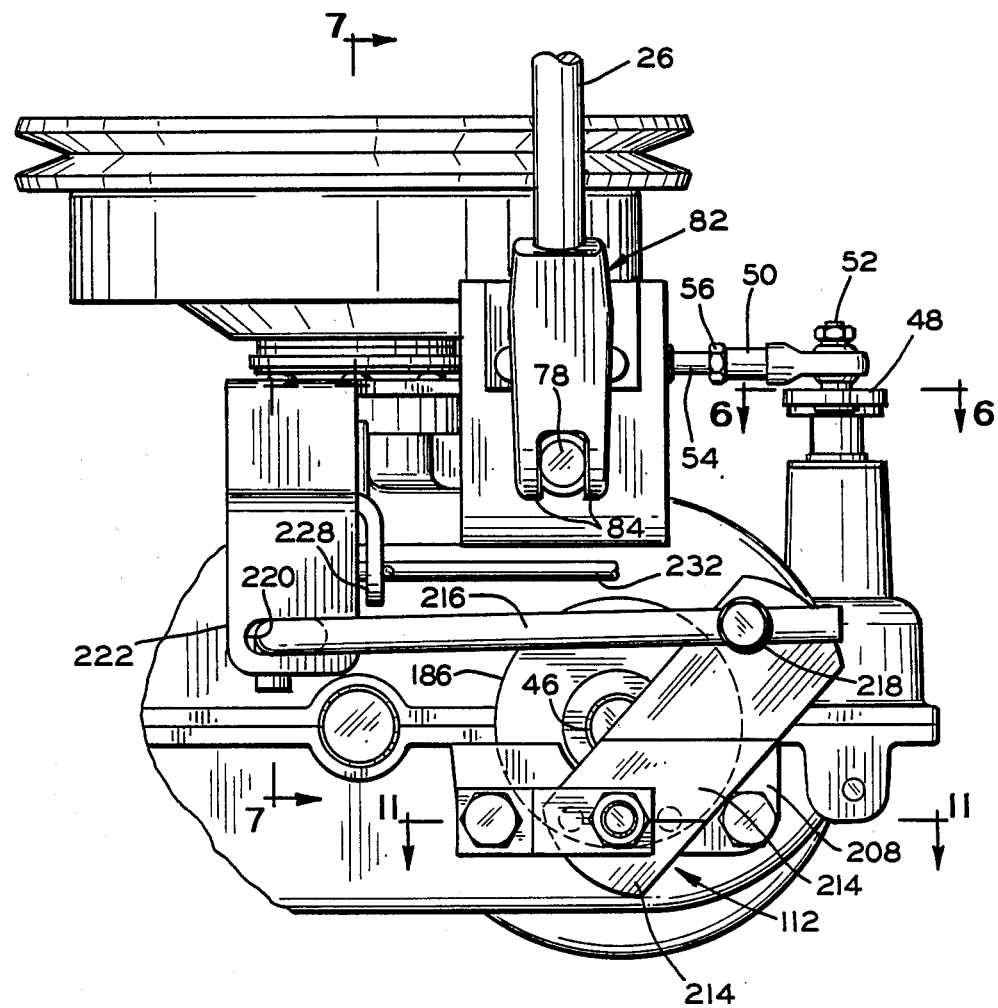
FIG. 5 is a fragmentary right side view of the transaxle and shift mechanism of FIG. 2.
Figure 6:
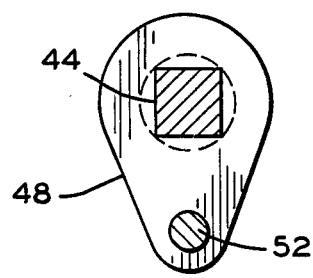
FIG. 6 is a detailed view, taken along the line 6—6 of FIG. 5.

The gear-engaged condition of the transaxle 32 is determined by an upwardly-extending pivotable shift means or shaft 44 (FIGS. 5 and 6). When the shift shaft 44 is turned, it causes a shift collar (not shown) to move along an intermediate drive shaft 46 (FIGS. 2 and 5) which causes a shift key to selectively engage gears rotatably mounted thereon. This arrangement is shown more fully in my U.S. Pat. No. 4,656,886, issued Apr. 14, 1987, and will not be discussed in detail. Specifically, the shift shaft 44 corresponds to the shift shaft 104 of the patent.

Figure 3:
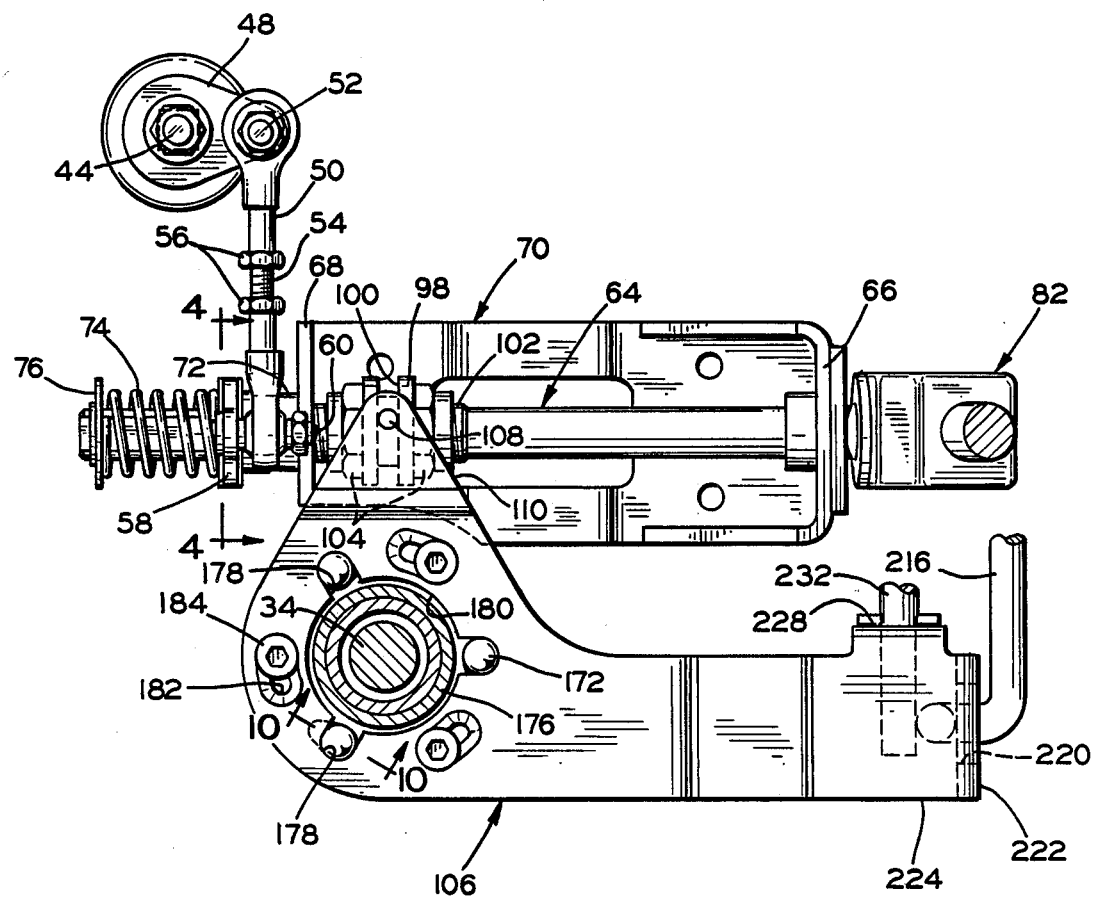
FIG. 3 is a top view, partly in section, of the shift mechanism in accordance with the invention.
Figure 4:
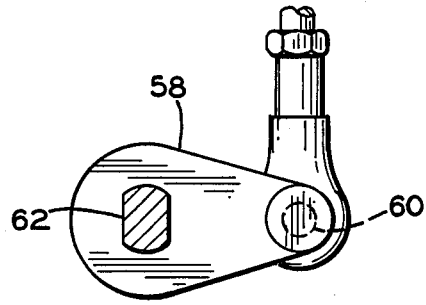
FIG. 4 is a detailed, fragmentary view, taken along the line 4—4 of FIG. 3.
Figure 7:
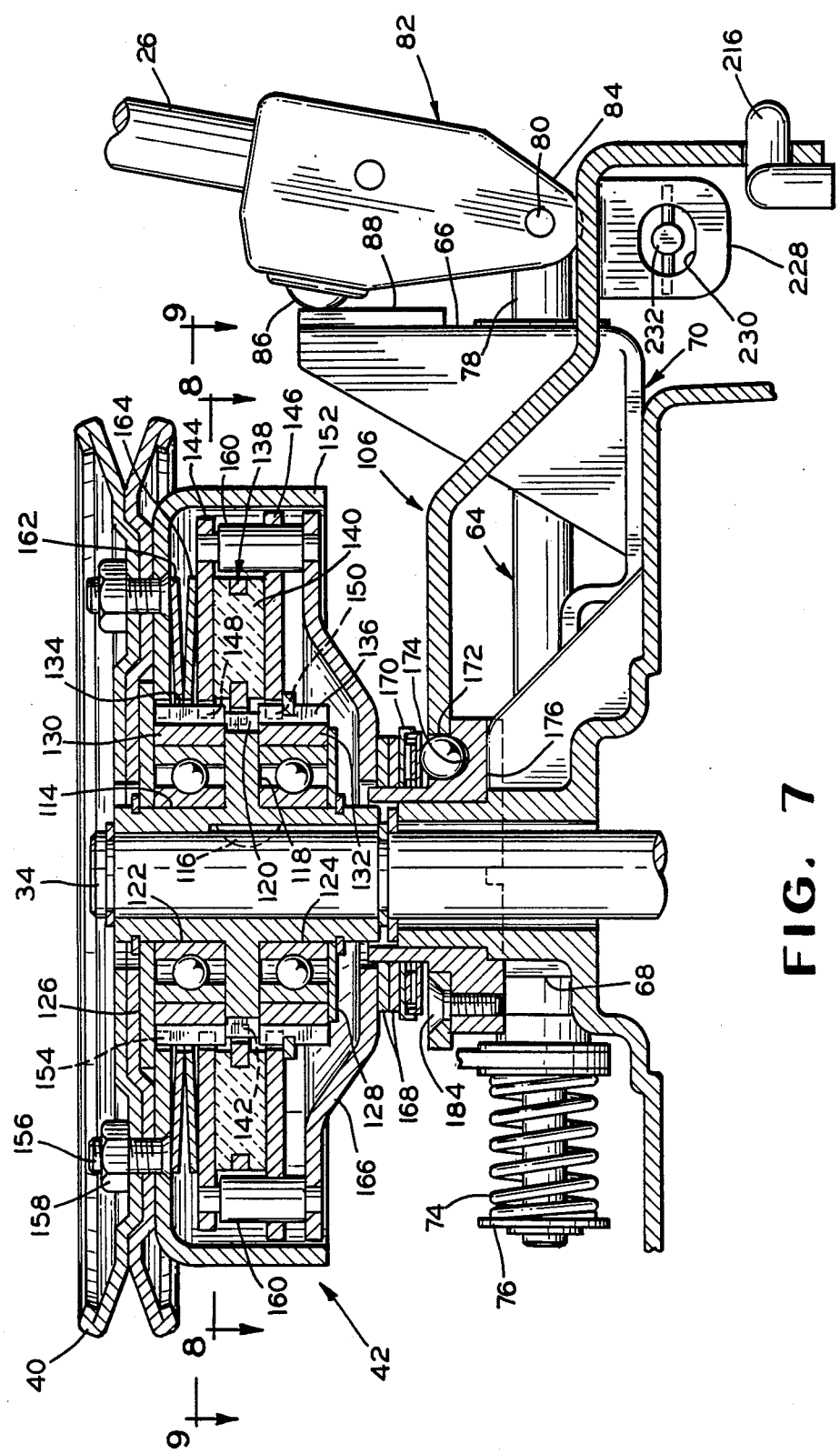
FIG. 7 is a fragmentary view in vertical cross section taken generally along the line 7—7 of FIG. 5.

A shift arm 48 (FIGS. 3, 5, and 6) is affixed to an upper end of the shift shaft 44 and extends transversely therefrom. The arm 48 is pivotally connected to a connecting link 50 by a pin 52 and is turned when the link 50 is moved generally axially. The connecting link 50 has a turn-buckle adjustment consisting of a rod 54 which has oppositely threaded ends and jam nuts 56. Of course, other length-adjusting means for the link 50 can be employed. The other end of the link 50 is pivotally connected to an actuating arm 58 (FIGS. 3 and 4) by a pin 60. The arm 58, in turn, is slidably mounted on a non-circular portion 62 (FIG. 4) of an actuating member or rod 64 (FIGS. 2, 3, and 7). When the actuating rod 64 is turned, it turns the actuating arm 58, causing the connecting link 50 to move generally axially to turn the shift arm 48 and the shift shaft 44. Thus, the extent of rotating or turning of the rod 64 determines the gear-engaged condition of the transaxle 32.

The actuating rod 64 is slidably and rotatably mounted in end flanges 66 and 68 (FIGS. 3 and 7) of a mounting bracket 70 which is affixed to the transaxle 32. The actuating arm 58, being slidable on the non-rotatable portion 62 of the actuating rod 64, is held against axial movement when the rod 64 is so moved. This is accomplished by a collar or spacer 72 (FIG. 3) which bears against the end flange 68 and against one side of the arm 58. The arm 58 is urged against the collar by a coiled spring 74 maintained under compression between the arm 58 and a retaining washer 76 on the end of the actuating rod 64.

For the purpose of turning and axially moving the actuating rod 64, an outer end 78 thereof (FIGS. 5 and 7) extends beyond the bracket end flange 66 and is pivotally connected by a pin 80 to a shift lever-connecting member or socket 82 and specifically to bifurcated lower ends 84 thereof. A lower end of the triple-function shift lever 26 is suitably affixed in an upper recess of the member 82. A spherical body or ball 86 (FIG. 7) is held by and extends from the member 82 and bears against a hardened plate 88 affixed to an upper end of the end bracket 66. When the shift lever 26 is moved longitudinally of the vehicle 10, in a direction perpendicular to the sheet in FIG. 7, the member 82 is turned to turn the actuating rod 64 and shift the transaxle. When the shift lever 26 is moved transversely of the vehicle 10, parallel to the sheet in FIG. 7, the actuating rod 64 is moved transversely of the vehicle 10, parallel to the sheet in FIG. 7, the actuating rod 64 is moved axially as the member 82 pivots at the contact point between the ball 86 and the plate 88. The rod 64 is moved with or against the force of the coiled spring 74 on the opposite end of the rod 64.

More specifically, when the shift lever 26 is moved along a longitudinal slot 90 (FIG. 2) in the guide slot 28, the actuating rod 64 is turned and the shift shaft 44 is turned to change the gear-engaged condition of the transaxle 32. In this instance, the transaxle is in any one of five forwrd speed conditions when the shift lever 26 is aligned with or in any one of five transverse notches or slots 92 which communicate with the longitudinal slot 90. When the shift lever 26 is aligned with a short transverse notch 94, the transaxle is in neutral, and when the lever is aligned with or in a longer transverse end notch or slot 96, the transaxle is in reverse.

As discussed before, the actuating rod 64 is axially moved when the shift lever 26 is transversely moved relative to the longitudinal extent of the vehicle 10 and transversely of the guide slot 28. The actuating rod 64 has a collar 98 (FIG. 3) mounted thereon, with an annular groove 100, for longitudinal and rotational movement therewith. For adjustment purposes, the collar 98 can have internal threads so that the collar is threadedly received on a threaded portion 102 of the rod 64 and can be longitudinally adjusted with respect to the rod by being turned on the threaded portion 102. The collar 98 is then held in a desired longitudinal position by jamb nuts 104.

An actuating lever 106 (see FIGS. 3 and 7) has a downwardly-extending pin 108 (FIG. 3) at an end portion 110 thereof which extends into the groove 100 of the collar 98. The lever 106 thereby is turned or pivoted when the collar 99 and the actuating rod 64 are moved axially. Pivoting of the lever 106 causes the clutch 42 to be in its engaged or disengaged position and also causes a brake 112 to be in a braking position or a release position.

Figure 8:
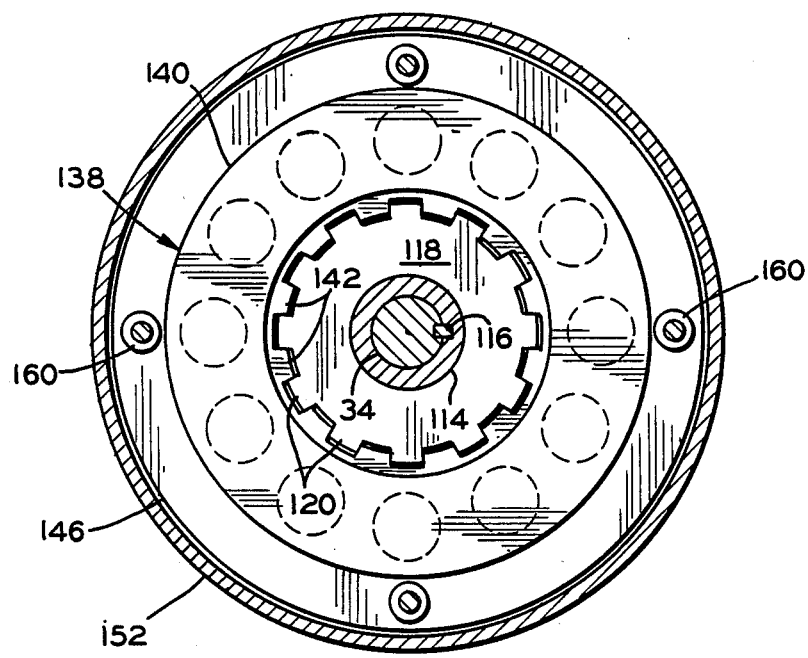
FIG. 8 is a view in horizontal cross section taken along the line 8—8 of FIG. 7.
Figure 9:
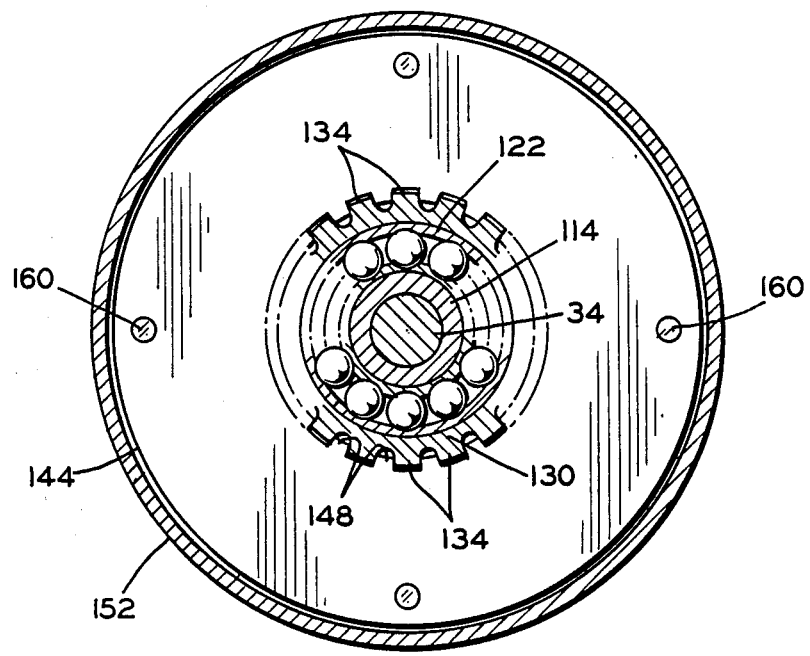
FIG. 9 is a view in horizontal cross section taken along the line 9—9 of FIG. 7.

The clutch 42 is shown in more detail in FIGS. 7-9. An annular hub 114 is positioned on an upper end of the input shaft 34 and is affixed thereto by a suitable key 116. A radial flange 118 extends outwardly from an intermediate portion of the hub 114 and terminates in teeth 120. Suitable bearings 122 and 124 are mounted around the hub 114 on each side of the flange 118 and are held by annular retainer plates 126 and 128. Upper and lower clutch rings 130 and 132 are positioned around the bearings 122 and 124 and have outer, radially-extending teeth 134 and 136.

A clutch disc 138 has a friction ring 140 of suitable friction material molded thereon and has radially inwardly-extending teeth 142 which engage the teeth 120 of the hub flange. The clutch disc 138 is positioned between upper and lower pressure plates 144 and 146 and is rotatable relative thereto when the clutch is in a disengaged position. The clutch plates 144 and 146 have radially inwardly-extending teeth 148 and 150 which engage the teeth 134 and 136 of the clutch rings 130 and 132 so that these plates and rings rotate together. A clutch housing 152 with a lower open side has radially inwardly-extending teeth 154 which also engage the teeth 134 of the upper ring 130. The clutch housing 152 is affixed to and rotates with the sheave 40 by suitable fasteners 156 and nuts 158. When the sheave 40 is rotated, it rotates the housing 152 which rotates the clutch ring 130 which, in turn, rotates the upper clutch plate 144. The upper clutch plate 144 is connected by shoulder pins 160 to the lower clutch plate 146 which also rotates with the upper plate 144. The lower plate 146 also rotates the lower clutch ring 132 through the teeth 150 and 136.

When the clutch 42 is in its disengaged position, the clutch disc 138 remains stationary as the clutch plates 144 and 146 rotate. The clutch is in the disengaged position when the shoulder pins 160 urge the upper clutch plate 144 upwardly against the force of two Belleville springs 162 and 164. The lower ends of the shoulder pins 160 extend through the lower clutch plate 146 and are received in outer portions of a circular actuating plate 166 through which the input shaft 34 extends, with the plate 166 closing off the lower open side of the clutch housing 152. The actuating plate 166 can be moved in a direction axially of the input shaft 34. When the plate 166 is in an upper position, it moves the upper clutch plate 144 upwardly against the force of the springs 162 and 164 so that the clutch disc 138 will be stationary when the clutch plates 144 and 146 rotate. When the actuting plate 166 is in a lower position, the springs 162 and 164 urge the upper plate 144 downwardly so that the clutch disc 138 is clamped between the clutch plates 144 and 146, the clutch then being in its engaged position. The clutch disc 138 thereby rotates with the clutch plates 144 and 146 and rotates the hub flange 118 and the hub 114 to drive the input shaft 34. In the engaged position of the clutch 42, the input shaft 34 thereby rotates with the sheave 40.

Figure 10:
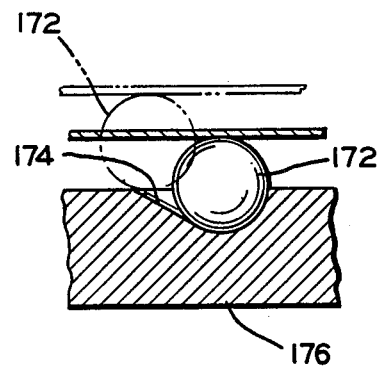
FIG. 10 is a fragmentary, detailed view in cross section taken along the line 10—10 of FIG. 3.

For the purpose of moving the actuating plate 166 axially of the input shaft 34, a central portion of the plate contacts and is supported by two annular rings 168 (FIG. 7) which, in turn, are supported by an annular thrust bearing 170. The bearing 170, in turn, is supported on three cam balls 172 (FIGS. 3, 7, and 10). The balls 172 are partially received in tapered cam recess 174 which are formed in an annular portion of a cam member 176. The cam member 176 (also see FIG. 2) is cast and is specially shaped to fit on the upper housing of the transaxle in a non-rotatable position with respect thereto. As best shown in FIG. 3, the cam balls 172 extend upwardly into notches 178 in the actuating lever 106, the notches facing a circular opening 180 in the lever through which the cam member 176 extends. Between the notches 178, the lever 106 has arcuate slots 182 through which extend shanks of fasteners such as machine screws 184 which are threadedly received in outer portions of the cam member 176. In this manner, the lever 106 is pivotally supported on the fixed cam member 176, being movable relative to the cam member by virtue of the fasteners 184 extending through the arcuate slots 182 of the lever 106.

When the lever 106 is pivoted by axial movement of the actuating rod 64, the notches 178 move the cam balls 172 in an arcuate manner. When the lever 106 is moved in a clockwise direction as viewed in FIG. 3, the balls 172 are moved in an arcuate path upwardly toward the shallow ends of the cam recesses 174, to the dotted line position of FIG. 10. This movement of the three balls correspondingly moves upwardly the thrust bearing 170, the rings 168 and the actuating plate 166. The shoulder pins 160 are similarly moved, which move the clutch plate 144 upwardly against the force of the springs 162 and 164. This causes the clutch 42 to be in its disengaged position whereby the clutch plates 144 and 146 rotate independently of the clutch disc 138. Similarly, when the actuating lever 106 is moved in a counter-clockwise direction, it moves the cam balls 172 toward the deeper ends of the cam recesses 174. The actuating plate 166 thereby moves downwardly whereby the upper clutch plate 144 is forced downwardly by the springs 162 and 164 to clamp the clutch disc 138 between the plates 144 and 146. In this condition, the clutch 42 is in its engaged position so that the sheave 40 drives the input shaft 34.

Figure 11:
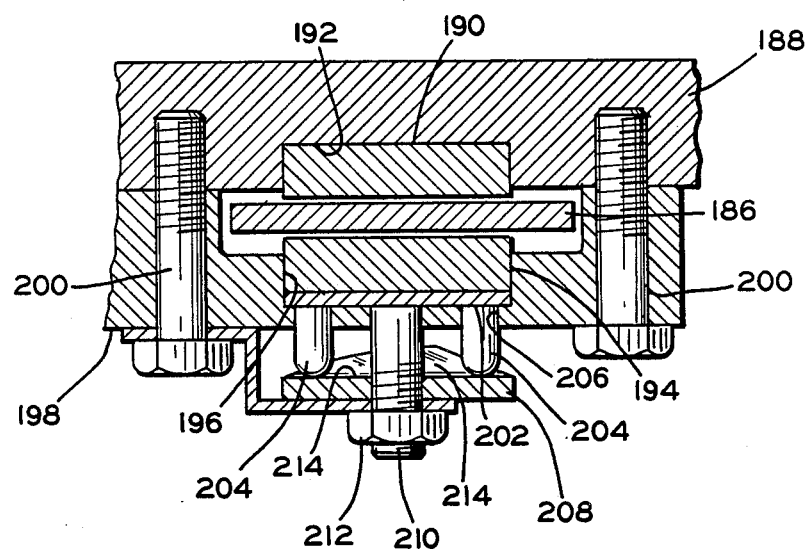
FIG. 11 is a fragmentary view in horizontal cross section taken along the line 11—11 of FIG. 5.

Refer now in more detail to the brake 112 as particularly shown in FIGS. 5 and 11. A similar brake is also shown in my U.S. Pat. No. 4,633,679, issued on Jan. 6, 1987. A brake disc 186 is suitably affixed to an outer end of the intermediate drive shaft 46 which extends beyond a housing 188 of the transaxle 32. The disc 186 could also be employed with a transaxle input shaft or with the output shafts 36 and 38. A fixed brake puck 190 is located on one side of the brake disc 186 in a recess 192 of the housing 188. A movable brake puck 194 is located on the other side of the disc 186 and is slidable in an opening 196 of a brake housing 198. The housing 198 is affixed to the transaxle housing 188 by suitable fasteners 200. A pressure plate 202 is located at the outer surface of the movable brake puck 194 and is engaged by two actuating pins 204 which are slidably held in bores 206 of the housing 198. A brake actuating lever 208 is pivotally mounted on a threaded shank 210 affixed to and extending outwardly from the housing 198, the lever being held by a nut 212. The brake lever 208 has slanted cam portions 214 which engage outer ends of the pins 204. When the brake lever 208 is pivoted counterclockwise from the position shown in FIG. 5, the slanted cam portions 214 thereof push the pins 204 inwardly to cause the disc 186 to be clamped between the puck 190 and 194, thereby placing the brake 112 in its braking position. When the brake lever 208 is pivoted back, pressure on the pins 204 is released whereby the disc 186 can rotate freely relative to the brake pucks 190 and 194, the brake 112 then being in its release position.

The brake lever 208 is pivotally moved by a brake actuating rod 216. One end portion of the brake rod 216 is pivotally connected to the brake lever by a suitable fastener 218 which is pivotally connected to the brake lever and clamped to the brake rod 216, being releasable to change the point at which the fastener 218 engages the rod, for adjustment purposes. The other end of the brake actuating rod 216 is bent inwardly to be received in a slot 220 located in a depending tang 222 (FIGS. 2, 3, and 5) extending downwardly at an outer end portion 224 of the actuating lever 106. The rod 216 is then bent downwardly inside the tang 222, as shown in FIG. 5, to prevent accidental separation of the rod from the tang. The slot 220 provides lost motion to enable the tang 222 and the lever 106 to have a limited pivotal movement without causing the rod 216 to pivot the brake lever 208 toward its braking position.

When the operating lever 106 is moved in a clockwise direction as shown in FIG. 3, the cam balls 172 are first moved up the cam recesses 174 to move the clutch plate 144 upwardly to move the clutch to its disengaged position. Further movement of the actuating lever 106 causes the tang 222 to move the brake actuating rod 216 when it reaches the other end of the slot 220. The rod 216 then pivots the brake lever 208 in a counterclockwise direction as viewed in FIG. 5 to move the brake 212 to its braking position after the clutch 42 has moved to its disengaged position. Movement of the actuating lever 106 in the opposite direction causes the brake 112 to move to its release position before the cam balls 162 move to the deeper ends of the cam recesses 174 so that the clutch plate 144 moves downwardly and places the clutch 42 in its engaged position.

As discussed previously, the actuating lever 106 is pivoted when the actuating rod 64 is moved axially, and the rod 64 is moved axially when the shift lever 26 is moved transversely relative to the longitudinal extent of the vehicle 10. The shift lever 26 basically has three transverse positions. In a right-hand extreme position, the shift lever is at the closed end of one of the transverse notches 92 and 96 (FIG. 2). At an intermediate transverse position, the shift lever 26 is aligned with the longitudinal slot 90. In the left-hand extreme transverse position, the shift lever is in a short longitudinal slot 224 located to the left of the main longitudinal slot 90 and connecting the neutral notch 94 and the reverse notch 96. A parking notch 226 is also generally aligned with the short longitudinal slot 224, with the shift lever 26 being in substantially the same extreme transverse position in either the slot 224 or the notch 226. The parking notch 226 is shaped so as to retain the shift lever therein when manually moved to that position by the operator.

When the shif lever 26 is in its extreme right-hand transverse position, the actuating rod 64 is urged to its extreme lift-hand axial position by the spring 74. The actuating lever 106 is then in its extreme counterclockwise position. The cam balls 172 are then in their lowest position and the clutch 42 is in its engaged position. The brake actuating rod 216 is in its extreme right-hand axial position as viewed in FIG. 5 and the brake lever 208 is in its extreme clockwise position, with the brake being in its release position. With the clutch engaged and the brake released, the transaxle 32 is driving the vehicle 10 in accordance with the rotational position of the actuating rod 64. This, in turn, is determined by the longitudinal position of the shift lever 26, depending upon which of the branch notches 92 and 92 the shift lever is in.

When the shift lever 26 is in its extreme left-hand transverse position, the actuating rod 64 is in its extreme right-hand axial position and the actuating lever 106 is in its extreme clockwise position. At this time, the cam balls 172 are raised to place the clutch 42 in its disengaged position. The brake actuating rod 216 is in its extreme left-hand axial position as viewed in FIG. 5 to move the brake actuating lever 208 counterclockwise and set the brake. Thus, when the shift lever 26 is in the slot 224 or the notch 226, the vehicle brake is set and the clutch is disengaged.

When the shift lever 26 is in its intermediate transverse position, aligned with the longitudinal slot 90, the actuating rod 64 is in an intermediate axial position and the actuating lever 106 is in an intermediate pivotal position. In this position, the cam balls 172 are raised to move the clutch 42 to its disengaged position but the brake actuating rod 216 is in an intermediate position in the slot 220 so that the brake is in its release position. The transaxle can then be shifted between any of its five forward speeds, as determined by the notches 92, with the clutch disengaged and the brake released. However, when it is desired to move the transaxle 32 between a forward speed condition and the reverse speed condition, the shift lever 26 must be moved to the extreme left-hand transverse position in the slot 224 which causes the clutch to be disengaged but the brake moved momentarily to its braking position before the change in the transaxle between forward and reverse can occur. This prevents a sudden, lurching movement of the vehicle which could otherwise occur with a sudden shift between forward and reverse.

The brake 112 can be moved to the braking position and the clutch 42 to the disengaged position by the foot pedal 24 (FIG. 1). For this purpose, the end 222 of the actuating lever 106 has a forwardly-facing depending tang 228 (FIGS. 5 and 7) with an opening 230. A connecting rod 232 (FIG. 5) is attached to the tang 228 and to the pedal 24. When the pedal is depressed, it moves the rod 232 rearwardly to move the lever 106 clockwise, as viewed in FIG. 3, to disengage the clutch and to set the brake.

From the above, it will be seen that the shift mechanism in accordance with the invention enables three functions to be achieved with a single shift lever. The transaxle or other gearbox can be shifted between various gear-engaged conditions. A clutch can be moved between its engaged and disengaged positions. A brake can be moved between its braking and release positions. Further, the transaxle cannot be moved between forward and reverse conditions without the brake being momentarily set.

Various modifications of the above-described embodiment of the invention will be apparent to those skilled in the art and it is to be understood that such modifications can be made without departing from the scope of the invention, if they are within the spirit and the tenor of the accompanying claims.

We claim:

1. In combination, a gearbox having an input shaft, an output shaft, and shift means including a shift shaft for causing said output shaft to be driven at different speeds, means for driving said input shaft including a clutch having an engaged position and a disengaged position, a brake for said gearbox having a braking position and a release position, a shift lever, and shift mechanism movable by said shift lever for enabling said shift mechanism to move said shift shaft in a manner to cause said output shaft to be driven at different forward speeds and a reverse speed, for enabling said shift mechanism to move said clutch between the engaged and disengaged positions, and for enabling said shift mechanism to move said brake between the braking and release positions.

2. The combination according to claim 1 characterized by said shift mechanism including an elongate member connected with said shift lever to enable said shift lever to rotate said elongate member about a longitudinal axis thereof, and to enable said shift lever to move said elongate member longitudinally.

3. The combination according to claim 2 characterized by said shift shaft causing said output shaft to be driven at different speeds when said shift shaft is turned, and linkage means connecting said elongate member and said shift shaft for turning about its longitudinal axis.

4. The combination according to claim 2 characterized by an actuating member engagable with said clutch to cause said clutch to move between the engaged position and the disengaged position when said elongate member is moved longitudinally.

5. The combination according to claim 2 characterized by an actuating member engagable with said elongate member and with said brake to cause said brake to move between the braking position and the release position when said elongate member is moved longitudinally.

6. The combination according to claim 4 characterized by said actuating member also being engagable with said brake to cause said brake to move between the braking position and the release position when said elongate member is moved longitudinally.

7. The combination according to claim 6 characterized by said actuating member being engagable with said brake through a lost-motion connection to cause said brake to move to the braking position after said clutch is moved to the disengaged position.

8. The combination according to claim 2 characterized by said elongate member being positioned relative to said shift lever rotates said elongate member about the longitudinal axis when said shift lever is moved along one path and said shift lever moves said elongate member longitudinally when said shift lever is moved along second paths which are transverse to the one path.

9. The combination according to claim 8 characterized further by means forming a guide slot through which said shift lever extends, said guide slot having a longitudinal slot for guiding said shift lever along the one path and having transverse slots into which said shift lever can be received when moved along the second paths.

10. Actuating mechanism for a drive system for small vehicles, which system includes a gearbox having an input shaft, an output shaft, and shift means for causing said output shaft to be driven at different forward speeds and a reverse speed, means for driving said input shaft including a clutch having an engaged position and a disengaged position, a brake for said gearbox having a braking position and a release position, and a shift lever, said actuating mechanism comprising shift mechanism, connecting means connecting said shift mechanism to said shift lever to enable said shift lever to operate said shift mechanism for moving said shift means in a manner to cause said output shaft to be driven at the different speeds, for moving said clutch between the engaged and disengaged positions, and for moving said brake between the braking and release positions.

11. Actuating mechanism according to claim 10 characterized by said shift mechanism including an elongate member connected by said connecting means with said shift lever to enable said shift lever to rotate said elongate member about a longitudinal axis thereof and to enable said shift lever to move said elongate member longitudinally.

12. Actuating mechanism according to claim 11 characterized by said shift means including a shift shaft causing said output shaft to be driven at the different speeds when said shift shaft is turned, and linkage means connecting said elongate member and said shift shaft for turning said shift shaft when said elongate member is rotated about its longitudinal axis.

13. Actuating mechanism according to claim 11 characterized by an actuating member engagable with said elongate member and engagable with said clutch to cause said clutch to move between the engaged position and the disengaged position when said elongate member is moved longitudinally.

14. Actuating mechanism according to claim 11 characterized by an actuating member engagable with said elongate member and with said brake to cause said brake to move between the braking position and the release position when said elongate member is moved longitudinally.

15. Actuating mechanism according to claim 13 characterized by said actuating member also being engagable with said brake to cause said brake to move between the braking position and the release position when said elongate member is moved longitudinally.

16. Actuating mechanism according to claim 15 characterized by said actuating member being engagable with said brake through a lost-motion connection to cause said brake to move to the braking position after said clutch is moved to the disengaged position.

17. The combination according to claim 11 characterized by said elongate member being positioned relative to said shift lever in a manner such that said elongate member is rotated about its longitudinal axis when said shift lever is moved along one path and said elongate member is moved longitudinally when said shift lever is moved along a second path which is transverse to the one path.

18. In combination, a gearbox having an input shaft, an output shaft, and shaft means including a shift shaft for causing said output shaft to be driven at different speeds, means for driving said input shaft including a clutch having an engaged position and a disengaged position, a brake for said gearbox having a braking position and a release position, a shift lever, and shift mechanism movable by said shift lever for enabling said shift mechanism to move said shift shaft in a manner to cause said output shaft to be driven at different speeds, for enabling said shift mechanism to move said clutch between the engaged and disengaged positions, and for enabling said shift mechanism to move said brake between the braking and release positions, said shift mechanism including an elongate member connected with said shift lever to enable said shift lever to rotate said elongate member about a longitudinal axis thereof, and to enable said shift lever to move said elongate member longitudinally.

19. The combination according to claim 18 characterized by said shift means causing said output shaft to be driven at a forward speed and a reverse speed, said shift mechanism causing said brake to move from said release position to said braking position and back again as said output shaft is changed between the forward speed and the reverse speed.

20. Actuating mechanism for a drive system for small vehicles, which system includes a gearbox having an input shaft, an output shaft, and shift means for causing said output shaft to be driven at different speeds, means for driving said input shaft including a clutch having an engaged position and a disengaged position, a brake for said gearbox having a braking position and a release position, and a shift lever, said actuating mechanism comprising shift mechanism, connecting means connecting said shift mechanism to said shift lever to enable said shift lever to operate said shift mechanism for moving said shift means in a manner to cause said output shft to be driven at different speeds, for moving said clutch between the engaged and disengaged positions, and for moving said brake between the braking and release positions, said shift mechanism including an elongate member connected by said connecting means with said shift lever to enable said shift lever to rotate said elongate member about a longitudinal axis thereof and to enable said shift lever to move said elongate member longitudinally.

21. Actuating mechanism according to claim 20 characterized by said shift means causing said output shaft to be driven at a forward speed and a reverse speed, said shift mechanism causing said brake to move from said release position temporarily to said braking position when said output shaft is changed between the forward speed and the reverse speed.

22. In combination, a gearbox having a forward speed and reverse, and shift means for shifting said gearbox between the forward speed and reverse, means for driving said gearbox including a clutch having an engaged position and a disengaged position, a brake for said gearbox having a braking position and a release position, a shift lever, and shift mechanism movable by said shift lever for actuating said shift means to cause said gearbox to shift between the forward speed and reverse, for moving said clutch from the engaged position temporarily to the disengaged position when said gearbox is being shifted between the forward speed and reverse, and for moving said brake from the release position temporarily to the braking position when said gearbox is being shifted between the forward speed and reverse, said shift mechanism comprising an elongate member connected to said shift lever, linkage means connecting said elongate member with said shift means to cause said gearbox to shift between the forward speed and reverse, and an actuating member connecting said elongate member with said clutch and with said brake for moving said clutch from the engaged position temporarily to the disengaged position when said gearbox is being shifted between the forward speed and reverse, and for moving said brake from the release position temporarily to the braking position when said gearbox is being shifted between the forward speed and reverse.

* * * * *

UNITED STATES PATENT AND TRADEMARK OFFICE
CERTIFICATE OF CORRECTION

PATENT NO. : 4,844,227
DATED : July 4, 1989
INVENTOR(S) : Paul A. Crawford et al It is certified that error appears in the above-identified patent and that said Letters Patent is hereby corrected as shown below:

Column 1, line 8, change "transmisions" to --transmissions--.

Column 3, line 26, change "forwrd" to --forward--.

Column 4, line 52, change "recess" to --recesses--.

Column 6, line 38, change "shif" to --shift--.

Column 6, line 52, change "92" (second occurrence) to --96--.

Column 10, line 12, claim 20, line 12, change "shft" to --shaft--

Signed and Sealed this

Sixth Day of March, 1990

Attest:

JEFFREY M. SAMUELS

*Attesting Officer*     *Acting Commissioner of Patents and Trademarks*